US010560742B2

(12) United States Patent
de Juan et al.

(10) Patent No.: US 10,560,742 B2
(45) Date of Patent: Feb. 11, 2020

(54) POINTER ACTIVITY AS AN INDICATOR OF INTERESTINGNESS IN VIDEO

(71) Applicant: Oath Inc., New York, NY (US)

(72) Inventors: Paloma de Juan, New York, NY (US); Yale Song, New York, NY (US); Gloria Zen, Trento (IT)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 15/008,711

(22) Filed: Jan. 28, 2016

(65) Prior Publication Data

US 2017/0223411 A1    Aug. 3, 2017

(51) Int. Cl.
```
H04N 21/442      (2011.01)
H04N 21/437      (2011.01)
H04N 21/4728     (2011.01)
G06F 3/0354      (2013.01)
G06F 3/0338      (2013.01)
G06F 3/038       (2013.01)
```

(52) U.S. Cl.
CPC ....... *H04N 21/44231* (2013.01); *G06F 3/038* (2013.01); *G06F 3/03543* (2013.01); *H04N 21/437* (2013.01); *H04N 21/44222* (2013.01); *H04N 21/4728* (2013.01)

(58) Field of Classification Search
CPC .... G06Q 30/0273; G06Q 30/02; G06Q 30/00; G06Q 30/0241; G06Q 30/0251; G06F 17/30864; G06F 17/3089; G06F 17/30861; G06F 17/30; G06F 17/00; G06F 17/30867; G06F 3/03547; G06F 3/04812; G11B 27/19; H04N 21/252; H04N 21/4532; H04N 21/8549; H04N 21/2343; H04N 21/4355; H04N 21/44222; H04N 21/4621; H04N 21/6377; H04N 21/44231; H04N 21/4728; H04N 21/4667

See application file for complete search history.

(56) References Cited

U.S. PATENT DOCUMENTS 7,031,596 B2 * 4/2006 Sai ....................... G11B 19/022
                                                    348/E5.102
7,366,994 B2 * 4/2008 Loui ................. G06F 17/30265
                                                    707/E17.026

(Continued)

OTHER PUBLICATIONS

Yu, Bin et al., "Video Summarization Based on User Log Enhanced Link Analysis," MM '03, Nov. 2-8, 2003, Berkeley, California, USA, 11 pages.

(Continued)

*Primary Examiner* — Benjamin R Bruckart
*Assistant Examiner* — Jen-Shi Huang
(74) *Attorney, Agent, or Firm* — Cooper Legal Group, LLC

(57) ABSTRACT

A method is provided, that initiates with providing a video over a network to a plurality of client devices, wherein each client device is configured to render the video and track movements of a pointer during the rendering of the video. Movement data that is indicative of the tracked movements of the pointer is received over the network from each client device. The movement data from the plurality of client devices is processed to determine aggregate pointer movement versus elapsed time of the video. The aggregate pointer movement is analyzed to identify a region of interest of the video. A preview of the video is generated based on the identified region of interest.

20 Claims, 6 Drawing Sheets

(56) References Cited

U.S. PATENT DOCUMENTS

| | | | | |
|---|---|---|---|---|
| 7,908,556 | B2* | 3/2011 | Shamma | G06F 17/30525 715/716 |
| 8,296,172 | B2* | 10/2012 | Marci | G06Q 10/10 705/7.29 |
| 8,306,977 | B1* | 11/2012 | Gildfind | G06F 17/3064 707/734 |
| 9,088,823 | B1* | 7/2015 | Price | H04N 21/4667 |
| 9,253,533 | B1* | 2/2016 | Morgan | H04N 21/44008 |
| 9,465,435 | B1* | 10/2016 | Zhang | G06F 3/01 |
| 9,514,436 | B2* | 12/2016 | Marci | G06Q 10/10 |
| 2006/0282776 | A1* | 12/2006 | Farmer | G11B 27/34 715/719 |
| 2009/0025023 | A1* | 1/2009 | Pradeep | A61B 5/04842 725/10 |
| 2010/0070620 | A1* | 3/2010 | Awadallah | H04L 63/1425 709/224 |
| 2010/0177042 | A1* | 7/2010 | Chen | G06F 3/038 345/159 |
| 2011/0202562 | A1* | 8/2011 | Bloch | G06F 17/3002 707/776 |
| 2014/0068461 | A1* | 3/2014 | Campbell | H04L 65/4084 715/753 |
| 2014/0089801 | A1* | 3/2014 | Agrawal | G06F 3/0484 715/719 |
| 2014/0143345 | A1* | 5/2014 | Jiang | H04L 12/1831 709/205 |
| 2014/0188766 | A1* | 7/2014 | Waldman | G06F 17/30994 705/400 |
| 2015/0181301 | A1* | 6/2015 | Bloch | H04N 21/47217 725/41 |
| 2015/0373281 | A1* | 12/2015 | White | G06F 3/0482 348/660 |
| 2017/0055014 | A1* | 2/2017 | Bou Balust | H04N 21/2668 |

OTHER PUBLICATIONS

Wu, Shao-Yu, "Video Summarization via Crowdsourcing," *CHI* 2011, May 7-12, 2011, Vancouver, BC, Canada, 6 pages.

Valdez, Patricia and Mehrabian, Albert, "Effects of Color on Emotions," Journal of Experimental Psychology: General, 1994, vol. 123, No. 4, pp. 394-409.

Song, Yale et al., "TVSum: Summarizing Web Videos Using Titles," 9 pages.

Shamma, David A. et al., "Watch What I Watch, Using Community Activity to Understand Content," *MIR* '07, Sep. 28-29, 2007, Augsburg, Bavaria, Germany, pp. 275-283.

Shamma, David A. et al., "Tweet the Debates, Understanding Community Annotation of Uncollected Sources," *WSM*, '09, Oct. 23, 2009, Beijing, China, 8 pages.

Rodden, Kerry et al., "Eye-Mouse Coordination Patterns on Web Search Results Pages," *CHI* 2008, Apr. 5-10, 2008, Florence, Italy, 6 pages.

Potapov, Danila et al., "Category-Specific Video Summarization," *ECCV 2014—European Conference on Computer Vision*, Sep. 2014, Zurich, Switzerland. Springer, 2014, 17 pages.

Peng, Wei-Ting et al., "Editing by Viewing: Automatic Home Video Summarization by Viewing Behavior Analysis," *IEEE Transactions on Multimedia*, Jun. 2011, 13 pages.

Olsen, Jr., Dan R., "Video Summarization Based on User Interaction," *EuroITV* '11, Jun. 29-Jul. 1, 2011, Lisbon, Portugal, pp. 115-122.

Nichols, Jeffrey, et al., "Summarizing Sporting Events Using Twitter," *IUI* '12, Feb. 14-17, 2012, Lisbon, Portugal, 10 pages.

Money, Arthur G. and Agius, Harry, "Video Summarisation: A Conceptual Framework and Survey of the State of the Art," *Journal of Visual Communication and Image Representation*, Feb. 2008, ResearchGate, pp. 121-143.

Mei, Tao, et al., "VideoSense—Towards Effective Online Video Advertising," *MM'07*, Sep. 23-28, 2007, Augsburg, Bavaria, Germany, pp. 1075-1084.

Marat, Sophie, et al., "Video Summarization Using a Visual Attention Model," *15 th European Signal Processing Conference (EUSIPCO 2007)*, Sep. 3-7, 2007, Poznan, Poland, pp. 1784-1788.

Ma, Yu-Fei et al., "A User Attention Model for Video Summarization," *ACM Multimedia* '02, Dec. 2002, Juan-les-Pins, France, 10 pages.

Ma, Yu-Fei et al., "A Generic Framework of User Attention Model and Its Application in Video Summarization," *IEEE Transactions on Multimedia*, vol. 7, No. 5, Oct. 2005, 13 pages.

Kim, Juho et al., "Crowdsourcing Step-by-Step Information Extraction to Enhance Existing How-to Videos," *CHI* 2014, Apr. 26-May 1, 2014, Toronto, Ontario, Canada, 10 pages.

Kim, Juho et al., "Understanding In-Video Dropouts and Interaction Peaks in Online Lecture Videos," *L@S* 2014, Mar. 4-5, 2014, Atlanta, GA, USA, 10 pages.

Karydis, Ioannis et al., "Identifying Important Segments in Videos: A Collective Intelligence Approach," *International Journal on Artificial Intelligence Tools*, Dec. 10, 2013, World Scientific Publishing Co., 20 pages.

Kamvar, Maryam et al., "MiniMedia Surfer: Browsing Video Segments on Small Displays," *CHI* 2004, Apr. 24-29, 2004, Vienna, Austria, 4 pages.

Ito, Yuichi et al., "Detecting Interesting Events using Unsupervised Density Ratio Estimation," Carnegie Mellon University, Pittsburgh, PA, USA, 10 pages.

Huang, Jeff et al., "No Clicks, No Problem: Using Cursor Movements to Understand and Improve Search," *CHI* 2011, May 7-12, 2011, Vancouver, BC, Canada, 10 pages.

Huang, Jeff et al., "User See, User Point: Gaze and Cursor Alignment in Web Search," *CHI* '12, May 5-10, 2012, Austin, Texas, USA, 10 pages.

Hauger, David et al., "Using Browser Interaction Data to Determine Page Reading Behavior," 12 pages.

Grabner, Helmut et al., "Visual Interestingness in Image Sequences," *MM* '13, Oct. 21-25, 2013, Barcelona, Spain, pp. 1017-1026.

Atterer, Richard, and Schmidt, Albrecht, "Tracking the Interaction of Users with AJAX Applications for Usability Testing," *CHI* 2007, Apr. 28-May 3, 2007, San Jose, California, USA, pp. 1347-1350.

Chen, Liang et al., "Smart Streaming for Online Video Services," *IEEE Transactions on Multimedia*, vol. 17, No. 4, Apr. 2015, pp. 485-497.

Chen, Liang et al., "Video Browsing—A Study of User Behavior in Online VoD Services," 2013 *IEEE*, 7 pages.

Breunig, Markus M., et al., "LOF: Identifying Density-Based Local Outliers," *Proceedings of the ACM Sigmod 2000 Int'l Conf. on Management of Data*, Dallas, TX, USA, 2000, pp. 1-12.

Borji, Ali, and Itti, Laurent, "State-of-the-Art in Visual Attention Modeling," *IEEE Transactions on Pattern Analysis and Machine Intelligence*, vol. 35, No. 1, IEEE Computer Society, Jan. 2013, pp. 185-207.

Bao, Xuan et al., "Your Reactions Suggest you Liked the Movie: Automatic Content Rating via Reaction Sensing," *UbiComp* '13, Sep. 8-12, 2013, Zurich, Switzerland, 10 pages.

Avlonitis, Markos, and Chorianopoulos, Konstantinos, "Video Pulses: User-Based Modeling of Interesting Video Segments," Jan. 12, 2014, vol. 2014, Hindawi Publishing Corporation, 9 pages.

Arapakis, Ioannis et al., "Understanding Within-Content Engagement through Pattern Analysis of Mouse Gestures," *CIKM* '14, Nov. 3-7, 2014, Shanghai, China, 10 pages.

\* cited by examiner

POINTER ACTIVITY AS AN INDICATOR OF INTERESTINGNESS IN VIDEO

BACKGROUND

1. Field of the Disclosure

The present disclosure relates to methods and systems for dynamic action selection for touch screens.

2. Description of the Related Art

In recent years, the amount of time people spend watching video content online has dramatically increased, as has the number of online videos. Because of this, it is becoming increasingly important to automatically process these videos and predict how users will react to the content. Major challenges for automated processing of videos include scalability and applicability to a variety of different video categories (e.g., sports, news, fashion, food, etc.).

Many existing systems rely on analyzing the video content to infer its interestingness, typically by making category-specific assumptions about what users are interested in (e.g., a home run in a baseball video). Unfortunately, the kind of video content available on many websites (e.g. Yahoo Screen) is rich and varied, and oftentimes difficult to categorize. This is especially true of user-generated video content.

Other approaches to automated processing of video rely on user feedback. However, such feedback should be collected at a large scale (as the feedback of a single user is not significant) and in a manner that it does not interfere with the user experience. This means that a signal is needed that can be passively collected. Some systems rely on psychological assessments, which can only be collected from a few users in a controlled setting. Some rely on video player interactions, which unfortunately are very sparse during an online video watching session.

It is in this context that implementations of the disclosure arise.

SUMMARY

Implementations of the present disclosure provide a novel method to estimate interestingness in online videos using implicit user feedback through the aggregation of the pointer activity of thousands of viewers. As the data is collected at a video watching session level, this method is computationally efficient and scalable to billions of videos. Notably, this approach is capable of efficiently handling a variety of video genres because no assumption on what constitutes interestingness is required. Predictions of interestingness can be applied to detect highlights in video, which can be used for a variety of applications, such as thumbnail selection, video summarization or video ad placement, as well as to understand what kind of content drives user attention.

Websites such as Yahoo, Tumblr, or any other website providing access to online video, can benefit from methods that provide a fast and efficient video browsing experience. This need is particularly strong in the case of video browsing on mobile devices, due to bandwidth and battery limitations. Predictions of interestingness can identify video highlights, which can be used to improve user experience through generation of high quality video previews, which would translate into higher user engagement.

This information can also be used to understand what kind of content users find interesting, which would bring more revenue to the service providers through contextual video ads and improved ad targeting strategy.

Broadly speaking, methods in accordance with the present disclosure can include the operations of collecting pointer activity from thousands of viewers, aggregating the collected pointer activity per video and transforming it into a signal that approximates the amount of collective user attention for each instant in the video. Then, a series of features can be extracted that capture the shape and temporal variations of the pointer signal, which are combined to produce the interestingness score.

The use of pointer activity to predict interestingness in online video is computationally much more efficient than previous methods based on other signals, and is further scalable with relative ease to billions of online videos.

Broadly speaking, implementations of the present disclosure provide methods and systems for using pointer activity as an indicator of interestingness in video. Several inventive implementations of the present disclosure are described below.

In some implementations, a method is provided, comprising: providing a video over a network to a plurality of client devices, wherein each client device is configured to render the video and track movements of a pointer during the rendering of the video; receiving, over the network from each client device, movement data that is indicative of the tracked movements of the pointer; processing the movement data from the plurality of client devices to determine aggregate pointer movement versus elapsed time of the video; analyzing the aggregate pointer movement to identify a region of interest of the video; generating a preview of the video based on the identified region of interest.

In some implementations, providing the video includes providing a content page that includes the video, the content page including a pointer tracking module configured to track the movements of the pointer during the rendering of the video and generate the movement data.

In some implementations, the pointer tracking module is configured to determine a playback status of the video when tracking the movements of the pointer, the playback status identifying when the video was actively playing, wherein the movement data includes the playback status; wherein processing the movement data includes disregarding movement data indicative of movement or non-movement of the pointer that occurred when the video was not actively playing.

In some implementations, processing the movement data includes generating a pointer signal that indicates the aggregate pointer movement versus elapsed time of the video, wherein generating the pointer signal includes determining, for each of a plurality of time units of the video, a fraction, of the client devices that actively played the time unit of the video, that exhibited non-movement of the pointer.

In some implementations, analyzing the aggregate pointer movement includes determining rank percentiles of the pointer signal.

In some implementations, analyzing the aggregate pointer movement includes determining a slope of the pointer signal.

In some implementations, the region of interest of the video is correlated to a reduced amount of aggregate pointer movement relative to other regions of the video.

In some implementations, the preview of the video is defined by an image frame or a portion of the video.

In some implementations, a method is provided, comprising: transmitting a content page over a network to a plurality of client devices for rendering by the client devices to respective displays, the content page including a video and a cursor tracking module, the cursor tracking module configured to generate movement data identifying detected movement and non-movement of a mouse cursor when the video is playing; receiving over the network the movement data from the client devices; analyzing the movement data to identify one or more regions of interest of the video; generating a preview of the video based on the one or more regions of interest.

In some implementations, the mouse cursor is controllable by a peripheral device connected to a given client device, the movement and non-movement of the mouse cursor occurring in response to input data generated by the peripheral device.

In some implementations, analyzing the movement data includes determining one or more regions of the video having low levels of detected movement of the mouse cursor relative to overall levels of detected movement from all regions of the video.

In some implementations, a system is provided, comprising: a web server having at least one server computer, the web server configured to provide a video over a network to a plurality of client devices, wherein each client device is configured to render the video and track movements of a pointer during the rendering of the video; a pointer signal aggregator configured to receive, over the network from each client device, movement data that is indicative of the tracked movements of the pointer, the pointer signal aggregator configured to process the movement data from the plurality of client devices to determine aggregate pointer movement versus elapsed time of the video; an interestingness analyzer configured to analyze the aggregate pointer movement to identify a region of interest of the video; a preview generator configured to generate a preview of the video based on the identified region of interest.

In some implementations, the web server is configured to provide a content page that includes the video, the content page including a pointer tracking module configured to track the movements of the pointer during the rendering of the video and generate the movement data.

In some implementations, the pointer tracking module is configured to determine a playback status of the video when tracking the movements of the pointer, the playback status identifying when the video was actively playing, wherein the movement data includes the playback status; wherein the pointer signal aggregator is configured to disregard movement data indicative of movement or non-movement of the pointer that occurred when the video was not actively playing.

In some implementations, the pointer signal aggregator is configured to generate a pointer signal that indicates the aggregate pointer movement versus elapsed time of the video, wherein generating the pointer signal includes determining, for each of a plurality of time units of the video, a fraction, of the client devices that actively played the time unit of the video, that exhibited non-movement of the pointer.

In some implementations, analyzing the aggregate pointer movement includes determining rank percentiles of the pointer signal.

In some implementations, analyzing the aggregate pointer movement includes determining a slope of the pointer signal.

In some implementations, the region of interest of the video is correlated to a reduced amount of aggregate pointer movement relative to other regions of the video.

In some implementations, the preview of the video is defined by an image frame or a portion of the video.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
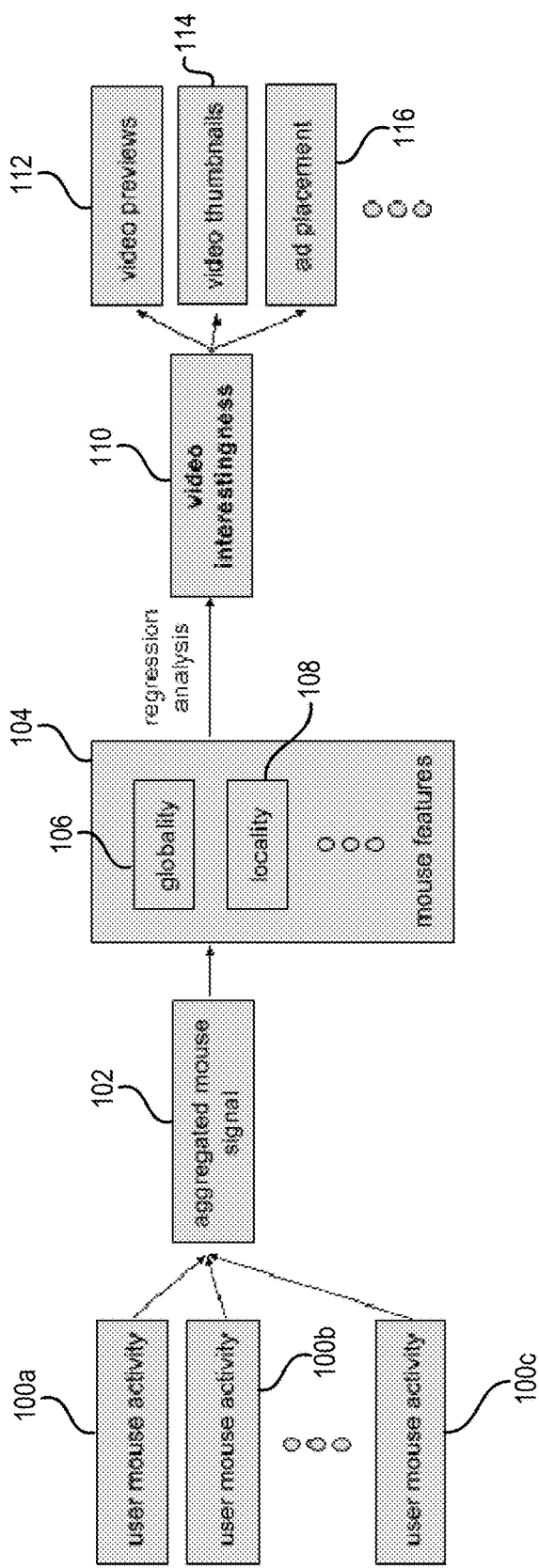
FIG. 1 illustrates a method for using pointer activity to estimate interestingness in a video, in accordance with implementations of the disclosure.

The following implementations describe systems and methods for using pointer activity as an indicator of interestingness in video. It will be obvious, however, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific example implementations. Subject matter may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, implementations may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. It is intended, for example, that claimed subject matter include combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

For purposes of the present disclosure, a pointer will be understood by those skilled in the art as a graphical element whose movements are controlled by a pointer device such as a mouse, touchpad, trackball, or other controller devices. Typically, the movement of the pointer echoes the movements of the pointer device. In some implementations, the pointer may also be referred to as a mouse cursor. The pointer serves to visually identify an active location within a graphical user interface (GUI), which may be selected, "clicked," or otherwise activated, possibly in response to additional input provided via the pointer device (e.g. pressing a button of a mouse, tapping a touchpad, etc.).

FIG. 1 illustrates a method for using pointer activity to estimate interestingness in a video, in accordance with implementations of the disclosure. The video is presented to a plurality of users, and for each user, their pointer activity is detected during the playback of the video. That is, for a given user, the video is rendered by a corresponding client device to a display for viewing by the user, and simultaneous with the rendering of the video, the activity of a pointer that is also rendered by the client device to the display is tracked. The pointer may be controlled, for example, by a mouse or other pointer device that is connected to (or integrated with) the client device. In the illustrated implementation, the pointer activity 100a, 100b, and 100c of various users is collected.

The pointer activity is aggregated and processed to define an aggregated pointer signal 102. The aggregated pointer signal 102 indicates the aggregate pointer activity of all users as a function of elapsed time of the video. In some implementations, the aggregate pointer signal defines, for a given time unit of the video, the fraction (or percentage) of users who exhibited no pointer movement, with respect to the total number of users who viewed the given time unit of the video.

Intuitively, it is expected that the amount of pointer activity during playback of the video will be inversely correlated to the interestingness of the video at a given time point. This is because a user that is engaged in watching the video will be less likely to move the pointer, whereas a user that is less engaged in watching the video will be more likely to move the pointer. For example, a user that is moving the pointer might be attempting to perform some action such as fast forwarding the video, pausing or stopping the video, navigating to another web page, switching browser tabs, switching application windows, etc. Regardless of the purpose of the pointer movement, the fact of its movement can indicate reduced engagement with the video, as compared to non-movement of the pointer, when the video is playing.

Thus, in accordance with implementations of the disclosure, the pointer signal 102 can be indicative of the interestingness versus elapsed time of the video. In some implementations, regions of interest of the video can be identified that are correlated to regions exhibiting low levels of pointer activity relative to overall levels of pointer activity for the entirety of the video, or relative to levels of pointer activity for surrounding time regions of the video.

While the aggregate levels of pointer activity can indicate interestingness in the video, more sophisticated techniques can be employed to account for additional characteristics of the pointer activity. Thus, in accordance with implementations of the disclosure, a set of pointer features 104 can be determined from analysis of the pointer signal 102, in order to capture the shape and temporal variation of the pointer signal 102. This is useful as two data points having the same absolute value could indicate an increase or a decrease in user interest, depending on whether they are located on an ascending or descending slope in the curve.

In some implementations, a globality feature 106 is determined, which aims to capture the position of each data point with respect to the rest of the data points in the pointer signal 102 curve. For example, in some implementations, each data point in the pointer signal 102 is scored according to its rank percentile.

In some implementations, a locality feature 108 is determined, which captures the surroundings of each data point, e.g. concatenating the value of neighboring data points within a given time range.

In some implementations, a local variation feature is determined, which captures the variation of each data point within its local range.

The pointer features 104 can be combined and processed to provide an interestingness score 110 for the video. In some implementations, the interestingness score 110 provides an estimate of the relative interestingness of the video as a function of the elapsed time of the video. In some implementations, a higher score indicates a higher degree of predicted user interest for a given time of the video.

The video interestingness score 110 can be utilized to identify regions of interest of the video. The regions of interest may be identified, by way of example without limitation, as those time periods of the video having the highest interestingness scores, or high interestingness scores relative to the overall range of scores, or time periods exhibiting peaks in the interestingness score, etc.

The regions of interest can be utilized to generate video previews 112 of the video. For example, a region of interest (or portion thereof) can itself define a video preview, or several regions of interest of the video (or portions thereof) can be concatenated to define the video preview. In some implementations, when multiple regions of interest have been identified, one of the identified regions of interest can be selected for generation of a video preview over the other identified regions of interest, for example, based on further analysis of the content occurring in the regions of interest of the video (e.g. based on recognition of faces or persons, recognition of objects, movement occurring in the video content, etc.).

In some implementations, video thumbnails 114 can be generated based on the video interestingness score 110. The video thumbnails 114 are defined by representative images or frames from the video. In some implementations, a video thumbnail is extracted from a region of interest of the video, as identified above. As noted, when multiple regions of interest are identified, one may be chosen based on further analysis of content. Additionally, the particular image that is extracted from a chosen region of interest may also be selected based on analysis of the content occurring in the image frames, including for example, recognition of faces, persons, objects, movement, etc.

In other implementations the video thumbnails 114 are chosen directly based on the video interestingness score 110. For example, video thumbnails 114 may be identified as those image frames of the video having the highest video interestingness scores, or having high video interestingness scores relative to the overall range of interestingness scores, or corresponding to peaks in the video interestingness score 110.

In some implementations, the video interestingness score 110 can be applied to determine placement of advertisements during playback of the video. The video interestingness score 110 identifies regions that are likely to be viewed and with which a user is likely to engage at a higher intensity. Therefore, it can be advantageous to present advertisements during such times, when the user's attention is likely to be heightened relative to other times in the video. Furthermore, when considering which advertisements to present with the video, the regions of interest of the video can be analyzed for their content, and advertisements can be selected and/or targeted based on the identified content.

Figure 2:
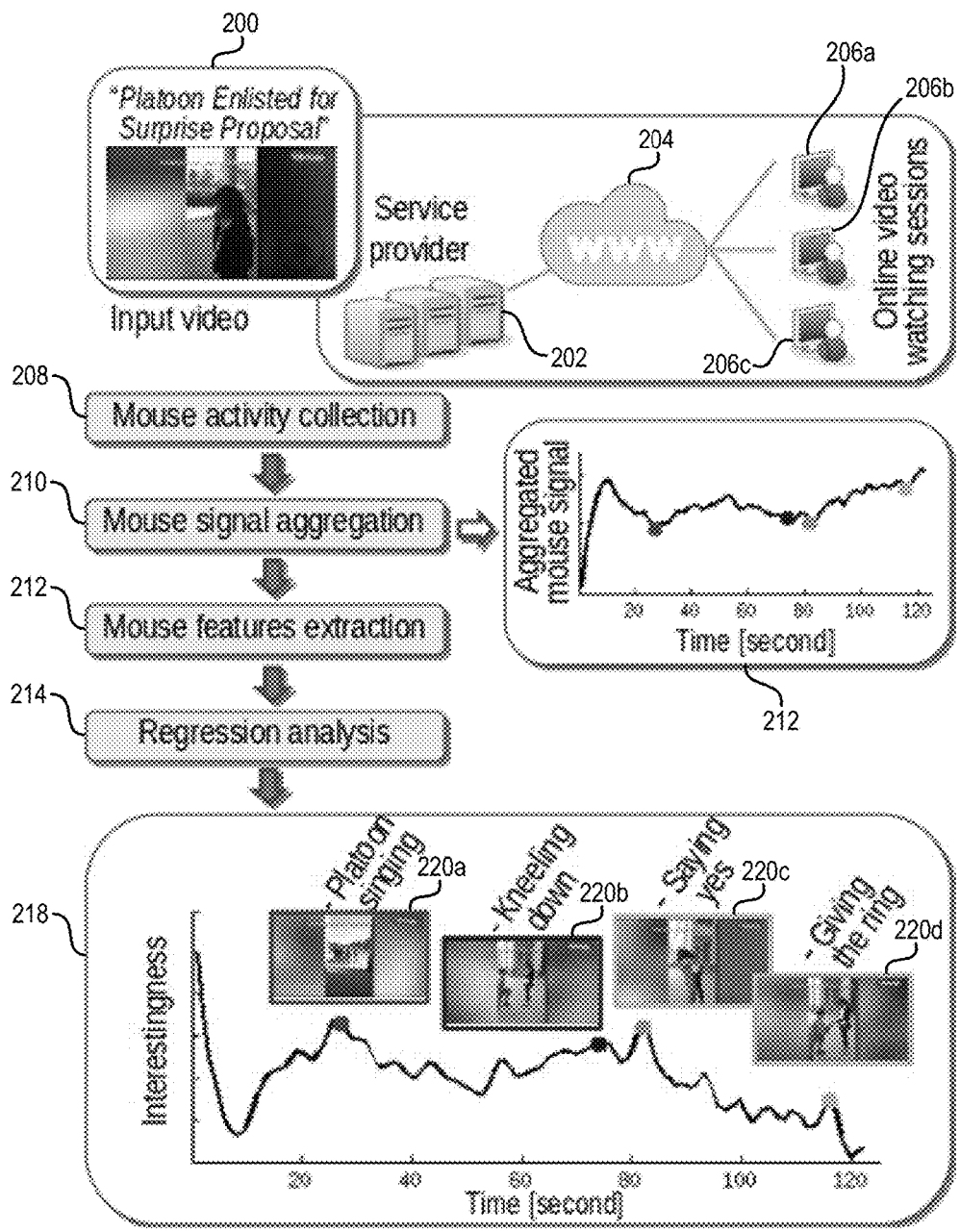
FIG. 2 illustrates a method for identifying interesting moments in a video based on detected pointer activity, in accordance with implementations of the disclosure.

FIG. 2 illustrates a method for identifying interesting moments in a video based on detected pointer activity, in accordance with implementations of the disclosure. In the illustrated implementation, a video 200 entitled "Platoon Enlisted for Surprise Proposal" is presented to a plurality of users. The video is about a news story that reports a man proposing to his girlfriend with the help of his platoon. The video is provided by a service provider 202 over a network 204 (which may include the Internet) to a plurality of client devices 206a, 206b, and 206c, by way of example. In some implementations, the service provider 202 transmits the video 200 as part of a web page to the client devices, for rendering via a browser application at the client device. In some implementations, the video 200 is transmitted for presentation through (or in combination with) other mechanisms, such as via a social network feed, via a dedicated application (or "app"), as part of a playlist, etc. It will be appreciated that the client devices 206a-c each render the video to a display device for viewing by respective users, and the display device can be separate but connected to the client devices or integrated with the client devices in various implementations.

At operation 208, pointer activity (or mouse activity) is collected from each of the client devices that renders the video 200. The pointer activity can be defined by data that characterizes the movement activity (including non-movement) of the pointer for a given client device.

In some implementations, to record the pointer movements of a user within a video page, a script can be included in the page and configured to run in the background on the same browser through which the user is watching the video. This script can be configured to periodically record the position of the pointer (e.g. every 100 milliseconds) from the moment the user enters the video page until the user leaves it.

Along with the pointer coordinates, the script may also record the video player status (e.g., play or pause). In some implementations, data collected while the video is paused is discarded or disregarded. In some implementations, movement is detected by comparing the position of the pointer in two consecutive instants.

In some implementations, the presence of movement is encoded in a binary vector whose size is equal to the session length, where 0 represents pointer movement and 1 represents pointer rest (non-movement). If the page loses focus (e.g., the user switches to another window) while the video is playing, then the script may encode the period until the page gains focus again (or the sessions ends) with a 0 as well. The data points can be grouped into larger time windows. By way of example without limitation, if pointer position is recorded every 100 milliseconds, then every 10 data points can be grouped into 1 second time windows, whose value is 1 if at least 5 out of 10 data points in the window have a value of 1.

It will be appreciated that the above-described methodology for collecting pointer activity is one example for which higher encoding values are associated with lower amounts of pointer movement, and conversely, lower encoding values are associated with greater amounts of pointer movement. Such a configuration encodes pointer activity as values that are negatively correlated to the amount of pointer movement activity. By employing a negative correlation, the encoded pointer activity then is expected to, at least approximately, positively correlate to predicted interestingness. However, it should be appreciated that in other implementations, pointer activity can be encoded as values that are positively correlated to the amount of pointer movement activity that is detected. In such a scheme, then it is expected that the encoded pointer activity will, at least approximately, exhibit a negative correlation to predicted interestingness.

At operation 210, the pointer activity data from the various client devices is aggregated into an aggregated pointer signal, which is illustrated by the graph 212. It should be appreciated that the graph 212 shows an aggregated pointer signal determined from pointer movement data in which encoded values are positively correlated to pointer movement. Various methods can be employed to generate the aggregated pointer signal, such as summing encoded values for each time point, averaging encoded values, determining a fraction or percentage of the users that exhibit movement/non-movement, etc.

In accordance with some implementations, each user session is represented as a vector of length L, where L is the length of the video in seconds. A value of 1 at time t indicates that the user was resting the pointer when the video was playing at second t; a value of 0 indicates the user was moving the pointer when the video was playing at second t; and a value of −1 indicates the session had already ended at second t (i.e., the user did not reach second t). The pointer signals of all the users who watched a specific video are combined into one single vector of length L, where each value represents the percentage (or fraction) of users who were resting (not moving) the pointer with respect to the number of users whose session had not ended by that time. This aggregated signal can be smoothed using regression.

At operation 214, pointer features are extracted through analysis of the aggregated pointer signal, the pointer features being designed to capture the shape and the temporal variations of the pointer signal. This is important because two data points with the same absolute value may indicate an increase in interest or a decrease in interest, depending upon whether they are located on an ascending or a descending slope in the curve.

For example, a globality feature can be determined which aims to capture the position of each data point with respect to the rest of the data points in the curve. For example, each data point can be scored according to its rank percentile, which is the percentage of scores in the frequency distribution of the aggregated pointer signal that are equal to or lower than that score.

As another example, a locality feature can be determined that captures the surroundings of each data point, concatenating the value of neighboring data points within a given time range. For example, in some implementations, for a given data point, values in the next one to five seconds are considered. In some implementations, values in the next three seconds are considered.

A local variation feature captures the variation of each data point within its local range. For example, in some implementations, a slope of the aggregated pointer signal at a given time can be determined. In some implementations, the local variation is determined for a given data point as the difference in values of two local data points. In some implementations, for a given time point, the difference is calculated between values of a later time point and an earlier time point (e.g. difference between values at one second later and two seconds prior). This provides a first order indication of local variation, approximately indicating the trend in values of the aggregate pointer signal at a given time point in the video.

While the foregoing represents a first order indication of local variation, a second order indication of local variation can be determined by employing a similar calculation but utilizing the first order results. In other words, if the prior calculation determines first order trend values, then a second order calculation could be defined for a given time point as the difference between first order trend values of a later time point and an earlier time point (e.g. difference between trend values at one second later and two seconds prior). The second order indication provides an approximate indication of the change in the trend of the aggregated pointer signal.

In some implementations, a spectral feature is determined for the aggregated pointer signal. For example, in some implementations, for a given time point, a Discrete Cosine Transform (DCT) is determined for a local range (e.g. one second prior to three seconds later than the given time point).

At operation 216, the pointer features are processed to yield a (predicted) interestingness score for each time point of the video. By way of example, the graph 218 illustrates a curve of predicted interestingness versus elapsed time for the video 200. More specifically, in accordance with some implementations, the pointer features presented in the previous section can be normalized to their mean and variance, and mapped into an interval (e.g. [0, 1]) using a sigmoid function. The final interestingness score can be computed by linearly combining the scores obtained by the pointer features.

Comparison of the aggregated pointer signal 212 and the interestingness score 218 reveals the close relationship between the video's 200 storyline and the aggregated mouse activities of over 2,600 users. The pointer signal represents the level of mouse movements aggregated over all the users watching the video, and it can be seen that the aggregated pointer signal (y-axis) is closely aligned with the highlights of the story. For instance, a high level of pointer movement can be observed after about 10 seconds as the news anchor introduces the story, which can be interpreted as a drop in user interest. The pointer movement level sharply decreases and negatively peaks at around the 30th second when the platoon starts singing a song to the woman, representing one of the most interesting moments in the video 200. Later, around the 80th second, the pointer movement decreases again as the man kneels down to propose to his girlfriend and she says yes—another interesting moment in the video 200. In the last part of the video, around the 118th second, another peak of interest can be observed when the man gives an engagement ring to his now fiancé. The aggregated pointer movement thus shows a high correlation to the interestingness of the video content.

It will be appreciated that representative image frames 220a-d or video segments occurring at the aforementioned interesting moments can be extracted from the video. These representative image frames or video segments can be utilized, alone or in combination, to generate video thumbnails or video previews for the video 200. Furthermore, in some implementations, advertisements can be inserted or presented at one or more of these locations during playback of the video 200.

As noted, to record the pointer movements of a user within a video page, a script can be configured to run in the background on the browser and record the position of the mouse every 100 ms throughout the video session. A session starts, by way of example, when the user enters the video page, by typing the URL in the address bar or through a link on another page. A session can also start if the video is part of a playlist. In the latter case, the session starts automatically when the previous video finishes and the new one is automatically loaded. The session ends when the user leaves the video page either by closing the tab or the browser, or navigating away from the page (e.g. loading a different page in the same tab).

The pointer coordinates can be buffered and sent back to the server, along with the playback status (e.g. play or pause) of the video player. This data can be processed as follows: If the video is playing, the current mouse position is compared to the previous one, and if both positions are the same, the event is registered as "no pointer movement," whereas if the position has changed, the event is registered as "pointer movement." If the video is not playing at that instant, then the data is discarded.

As the tracking of the pointer movement is defined from the browser window/tab, it will be appreciated that pointer movement can only be tracked when the browser window/tab containing the video is currently active. Any pointer movement occurring when the browser window/tab is not currently active is not detected. As a consequence, if the video is playing but its window/tab is not currently active, and the pointer is moving, this can be misinterpreted as "no pointer movement." To handle this scenario two additional browser events can be processed: "blur" and "focus." The former occurs when the page loses focus, i.e. if the user switches to a different tab or window (e.g. by clicking on it or using keyword shortcuts), or minimizes the window, while the latter occurs when the page gains focus again. When the page where the video is playing loses focus, the playback status is not affected (i.e. the video keeps playing), but the pointer movement cannot be tracked anymore. As it is not known whether the video player is still visible to the user, the whole period between the "blur" and the "focus" events is marked as "pointer movement." If the user does not return to the page within the video session (i.e. there is no "focus" event), the "blur" event is interpreted as the end of the session.

Figure 3:
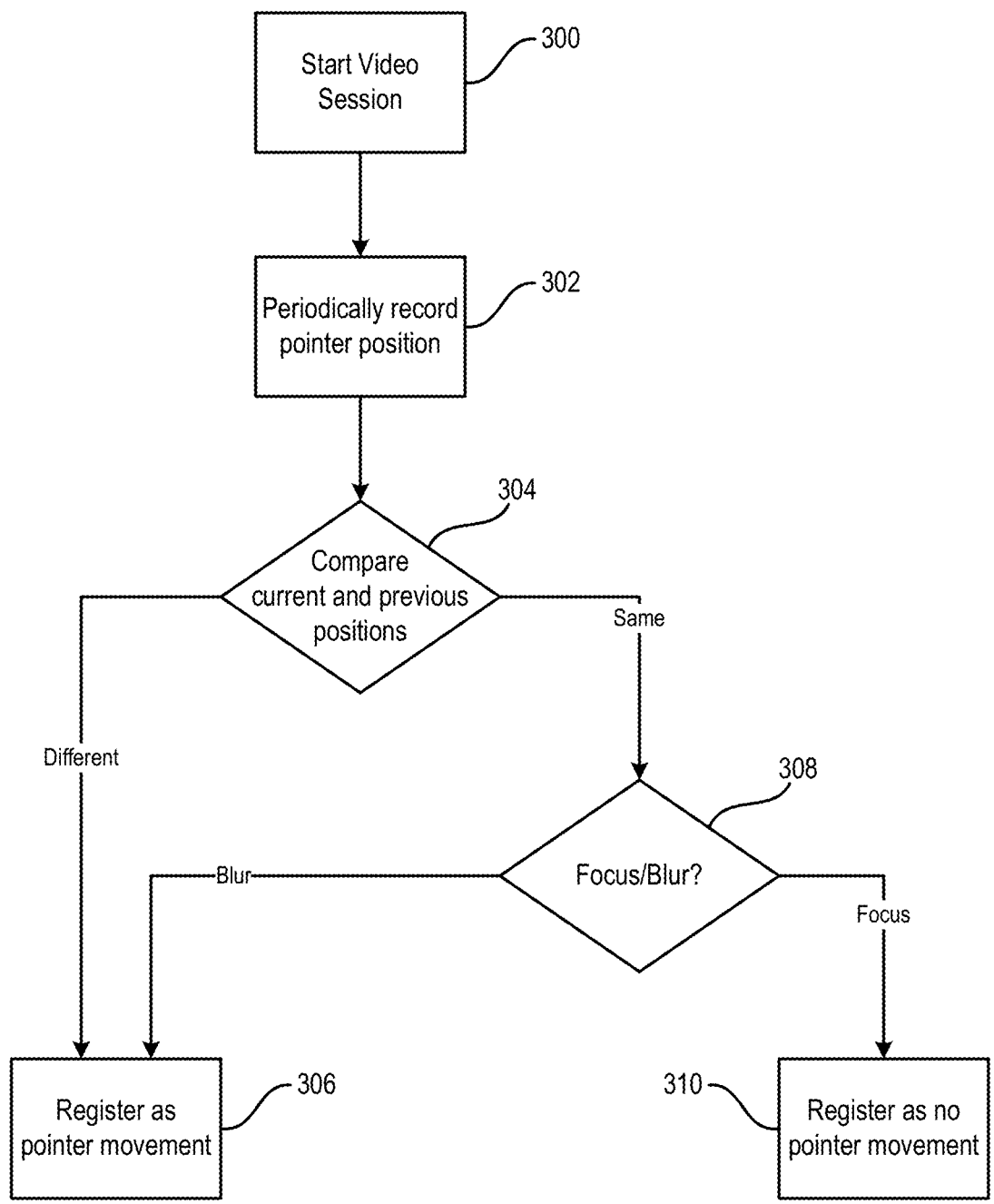
FIG. 3 illustrates a method for registering movement or non-movement of a pointer for purposes of determining interestingness in a video, in accordance with implementations of the disclosure.

FIG. 3 illustrates a method for registering movement or non-movement of a pointer for purposes of determining interestingness in a video, in accordance with implementations of the disclosure. At method operation 300, a video session is initiated, wherein a video is presented through a web page for viewing by a user. At method operation 302, the position of a pointer that is controlled by the user is periodically recorded. At method operation 304, the current and previous positions of the pointer are compared. If they are different, then at operation 306, the current position timestamp is registered as pointer movement. However, if at operation 304 the current and previous positions are the same, then at operation 308, it is determined whether the page displaying the video is current on focus or on blur. If the page is currently on blur, then the method proceeds to operation 306, registering the current position timestamp as pointer movement. If at operation 308, the page is on blur, then at method operation 310, the current position timestamp is registered as no pointer movement. After either registering as pointer movement or no pointer movement, the method returns to operation 304, comparing the next current and previous positions.

Figure 4:
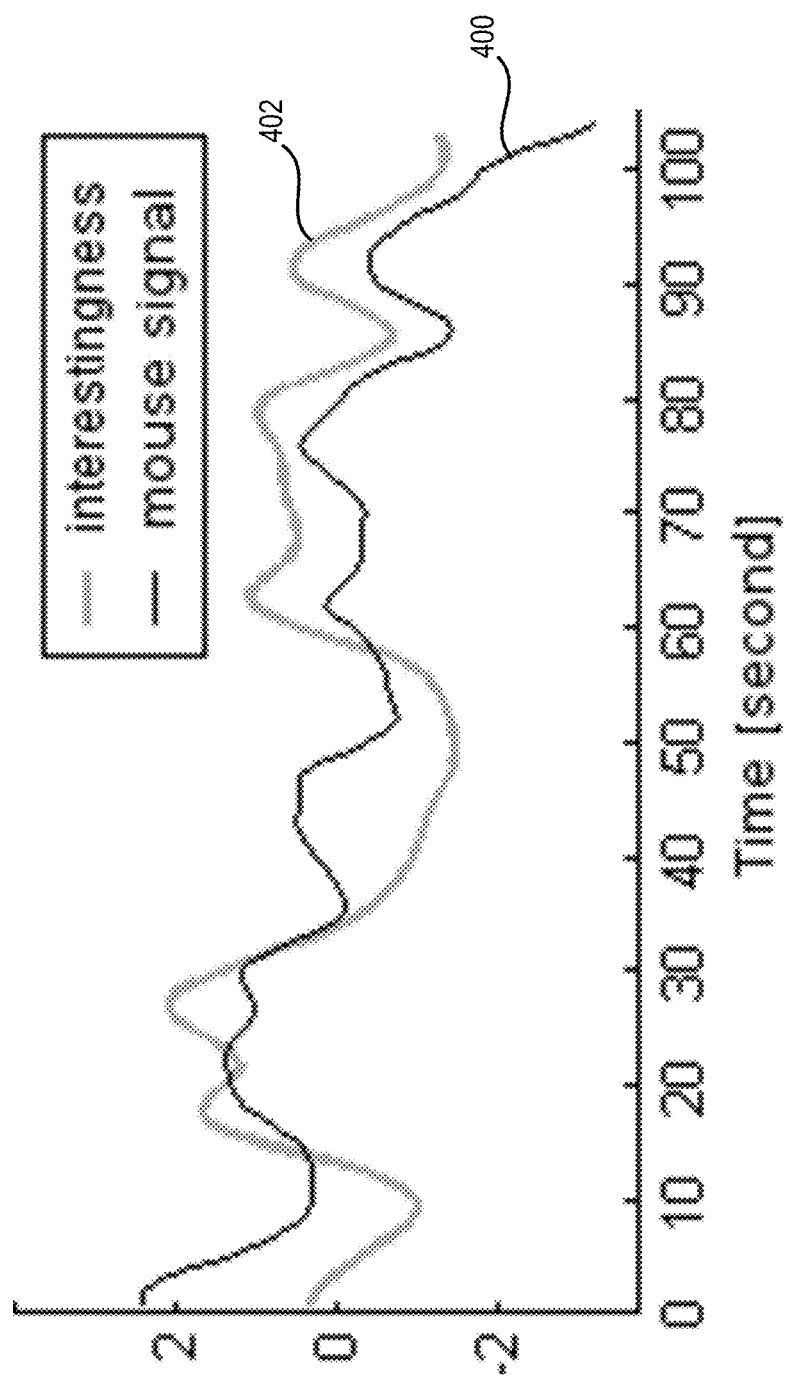
FIG. 4 is a graph illustrating a comparison between a pointer signal and survey results indicating interestingness in a video, in accordance with implementations of the disclosure.

FIG. 4 is a graph illustrating a comparison between a pointer signal and survey results indicating interestingness in a video, in accordance with implementations of the disclosure. The curve 400 indicates a pointer signal (or mouse signal) determined from tracked movements of a pointer during playback of a video, in accordance with implementations of the disclosure. The pointer signal can be determined in accordance with methods described above. The curve 402 indicates interestingness as determined from a survey of users who were shown the video, wherein the users indicated interesting or uninteresting parts of the video via recorded annotations. As can be seen, the pointer signal 400 exhibits a strong correlation to the survey-determined interestingness 402. The peaks of the pointer signal 400 are generally closely aligned with the peaks of the interestingness curve 402. This data demonstrates the validity of relying upon pointer signals as a predictor of interestingness.

Figure 5:
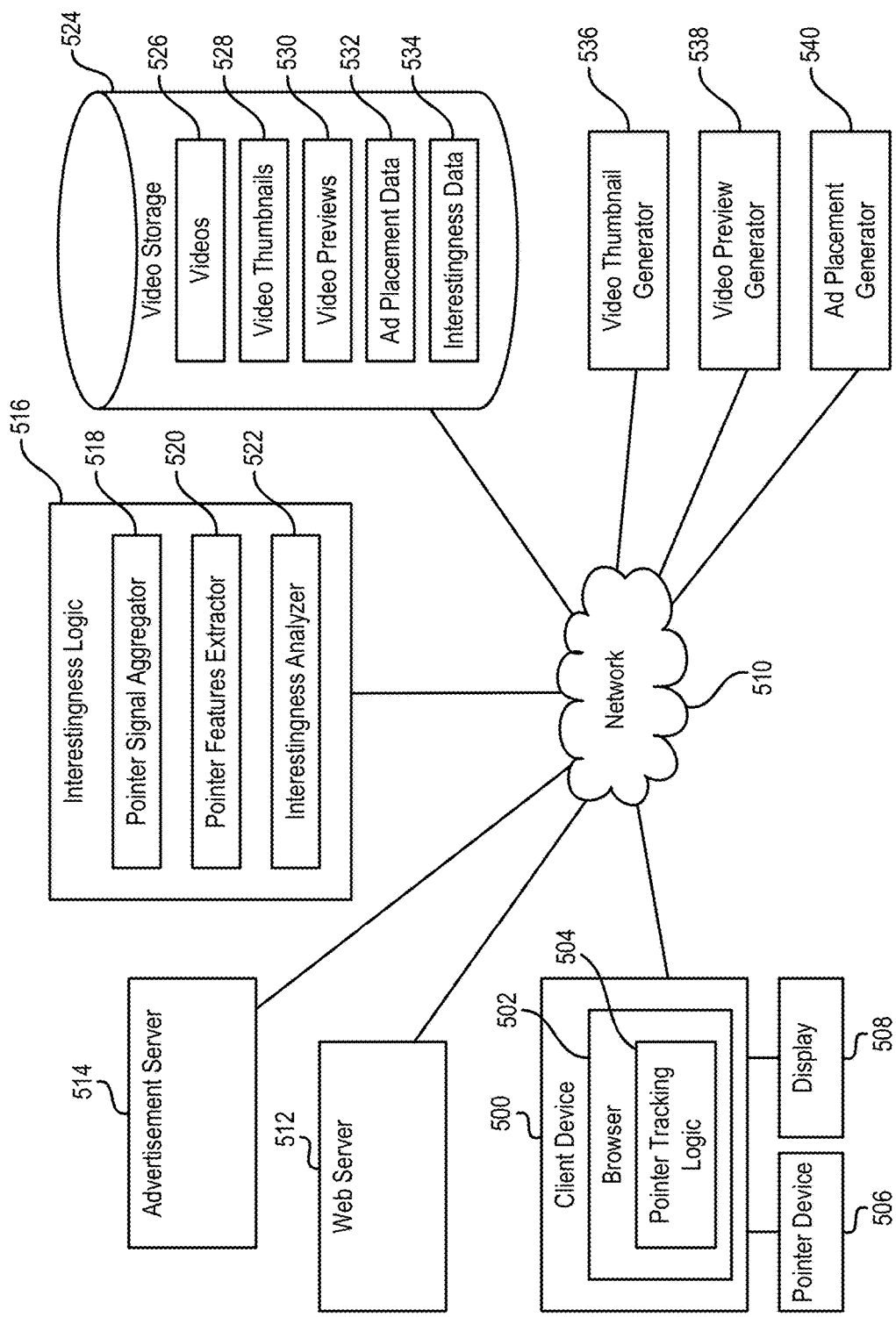
FIG. 5 illustrates a system for determining interestingness in video, in accordance with implementations of the disclosure.

FIG. 5 illustrates a system for determining interestingness in video, in accordance with implementations of the disclosure. A client device 500 executes a browser application 502 to access web pages or other Internet content over the network 510. The browser 502 may request a web page including a video from the web server 512. The web server 512 provides the requested web page with the video over the network 510 to the browser 502, for rendering to a display 508 by the client device 500. The video can be retrieved from a video storage 524 that includes a plurality of videos 526.

The web page can include a script that when executed defines pointer tracking logic 504 that is configured to track the movement and non-movement of the pointer, which can be recorded as indicated above. The pointer tracking logic 504 may also record the focus/blur state of the web page. The pointer is controlled by input received from a pointer device 506 (e.g. a mouse).

The data collected by the pointer tracking logic 504 is transmitted over the network 510 as movement data to an interestingness logic 516. The interestingness logic 516 includes a pointer signal aggregator 518 that is configured to aggregate the pointer movement data from many client devices such as client device 500 to generate an aggregated pointer signal, as discussed above. The interestingness logic further includes a pointer features extractor that is configured to calculate features of the aggregated pointer signal. An interestingness analyzer combines the pointer features to define an interestingness score, and further analyzes the interestingness score to determine regions or frames of interest in the video.

Any of the data generated or processed for purposes of determining the interestingness of the video can be stored in association with the video as part of interestingness data 534. By way of example, any of the pointer activity/movement data, focus/blur data, pointer signal data, pointer features data, interestingness scores, regions/frames of interest, can be stored as interestingness data 534 in association with the video.

The video thumbnail generator 536 may utilize the identified regions or frames of interest to generate one or more video thumbnail images, which can be stored in association with the video as part of the video thumbnails 528. The video preview generator 536 may utilize the identified regions or frames of interest to generate one or more video previews, which can be stored in association with the video as part of the video previews 530.

An ad placement generator 540 is configured to utilize the identified regions or frames of interest to determine (temporal) locations for placement of advertisements during playback of the video. The locations can be stored in association with the video as part of ad placement data 532. When the video is presented on a web page served by a web server such as web server 512, the playback of the video can be configured so that advertisements are presented when playback of the video reaches the ad placement locations. In some implementations, the advertisements may be requested from, or served by, an ad server 514.

In accordance with implementations of the present disclosure, the use of pointer activity to detect interestingness in video provides several advantages over existing methods. Once advantage is that use of pointer activity is efficient. Most existing approaches are content-based, extracting expensive audio and visual features and using advanced machine learning techniques to estimate the level of interestingness. Compared to those approaches, methods in accordance with the present disclosure are computationally much more efficient because pointer activity signal is low-dimensional and fast to compute.

Another advantage is that techniques based on pointer activity are scalable. Methods of the present disclosure capture and aggregate the pointer activity of thousands of users per video, and are scalable to billions of online videos by processing them in parallel.

Another advantage is that use of pointer activity is non-intrusive. The signal collection is passive and non-intrusive (e.g. pointer events are collected using JavaScript), so users can remain in their natural setting and their behavior is not affected by the data collection process, which is a crucial factor in designing online experiments.

Yet another important advantage of using pointer activity is that it is generalizable. Unlike previous work, implementations of the present disclosure can be applied to videos from a variety of domains, as no assumptions are made (or required to be made) about what makes the content of a video interesting.

Some methods focus on determining interestingness in video based on video content analysis. These methods do not scale well due to the cost of recruiting annotators, and are category-specific. Methods in accordance with the present disclosure do not require annotation and are completely domain-independent.

Some methods focus on determining interestingness in video based on user responses. However, these approaches do not translate well into the online video realm, due to the difficulty of obtaining user consent (e.g., facial expressions) or setting up expensive laboratory devices (e.g., brain signal sensors). Methods in accordance with the present disclosure require no external device, as the data collection script runs within a web browser.

In contrast to prior methods, implementations of the present disclosure use pointer activity as a proxy for user attention in the context of online video watching, and further use this implicit user feedback to detect interesting moments in video. It will be appreciated that pointer activity is determined by a physical activity or movement that is detected through hardware pointer devices such as a mouse or touchpad. Implementations of the present disclosure address the issue of how to determine which portions of a video are interesting to viewers in a manner that is transparent to the user. Collection of data from large numbers of users (e.g. thousands of users) requires one or more server computers in communication with remote client devices over the Internet. Such data is typically stored in databases defined in hardware storage devices, and the processing of such data from thousands of users as described herein would not be realistically feasible apart from using current computer technology in connection with the Internet.

Figure 6:
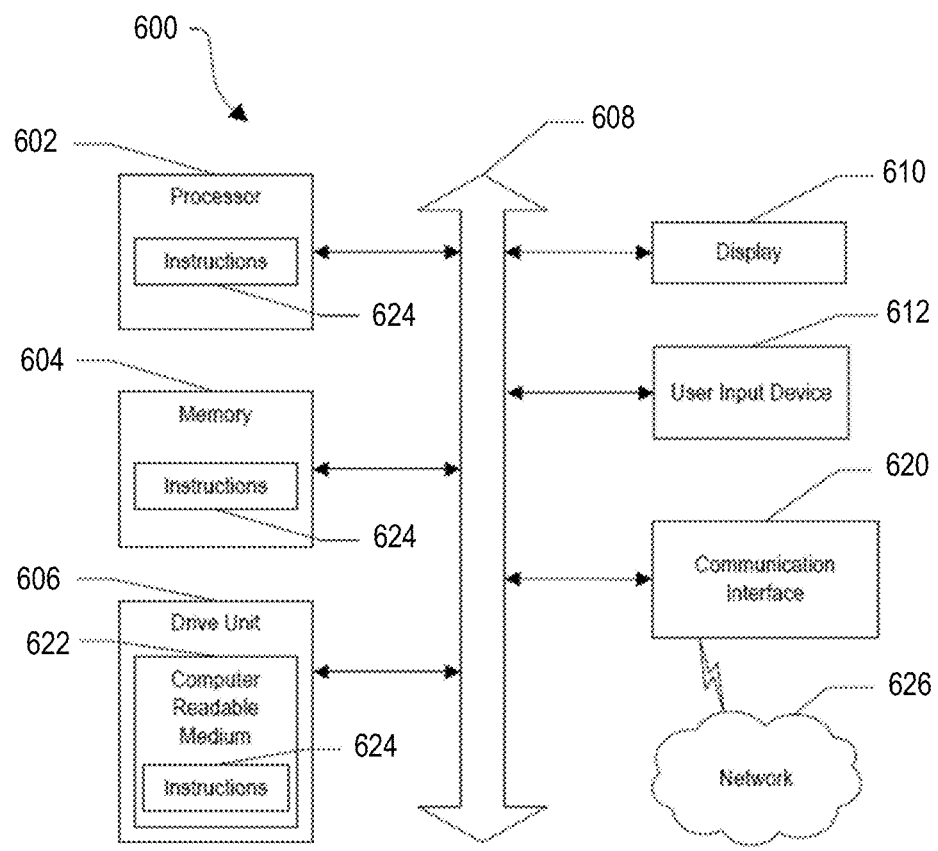
FIG. 6 illustrates an implementation of a general computer system, in accordance with an implementation of the disclosure.

FIG. 6 illustrates an implementation of a general computer system designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 600 may further include a display unit 610, such as a liquid crystal display (LCD), an organic light emitting diode (OLED), a flat panel display, a solid state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control or any other device operative to interact with the computer system 600.

The computer system 600 may also or alternatively include a disk or optical drive unit 606. The disk drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 626 can communicate voice, video, audio, images or any other data over the network 626. Further, the instructions 624 may be transmitted or received over the network 626 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 626, external media, the display 610, or any other components in system 600, or combinations thereof. The connection with the network 626 may be a physical connection, such as a wired Ethernet connection or may be established wirelessly as discussed below. Likewise, the additional connections with other components of the system 600 may be physical connections or may be established wirelessly. The network 626 may alternatively be directly connected to the bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 626. The network 626 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 626 may include wide area networks (WAN), such as the Internet, local area networks (LAN), campus area networks, metropolitan area networks, a direct connection such as through a Universal Serial Bus (USB) port, or any other networks that may allow for data communication. The network 626 may be configured to couple one computing device to another computing device to enable communication of data between the devices. The network 626 may generally be enabled to employ any form of machine-readable media for communicating information from one device to another. The network 626 may include communication methods by which information may travel between computing devices. The network 626 may be divided into sub-networks. The sub-networks may allow access to all of the other components connected thereto or the sub-networks may restrict access between the components. The network 626 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method, comprising:

providing a video over a network to a plurality of client devices, wherein each client device renders active playback of the video and tracks movements of a pointer occurring during the active playback of the video, the movements of the pointer being controlled by a pointer device that is connected to the client device, wherein providing the video includes providing a content page that includes the video, the content page including a pointer tracking module, that is stored in memory, that tracks the movements of the pointer as controlled by the pointer device during the active playback of the video and generates movement data;

receiving, over the network from each client device, the movement data, wherein the movement data quantifies the movements of the pointer as controlled by the pointer device during the active playback of the video, wherein the movement data includes values that identify movement and values that identify non-movement of the pointer occurring during the active playback of the video;

processing the movement data from the plurality of client devices to determine aggregate pointer movement versus elapsed time of the video, wherein processing the movement data includes generating a pointer signal that indicates amounts of the aggregate pointer movement versus the elapsed time of the video;

analyzing the aggregate pointer movement to identify a temporal region of interest of the video, wherein analyzing the aggregate pointer movement includes identifying a temporal region of the pointer signal that is used to identify the temporal region of interest of the video, wherein analyzing the aggregate pointer movement includes at least one of:

determining one or more rank percentiles of the pointer signal; or determining a slope of the pointer signal; and generating a preview of the video based on the temporal region of interest.

2. The method of claim 1, wherein the pointer tracking module determines a playback status of the video when tracking the movements of the pointer, the playback status identifying when the video was actively playing, wherein the movement data includes the playback status;

wherein processing the movement data includes disregarding movement data indicative of at least one of movement or non-movement of the pointer that occurred when the video was not actively playing.

3. The method of claim 1, wherein generating the pointer signal includes determining, for each of a plurality of time units of the video, a fraction, of the plurality of client devices that actively played the time unit of the video, that exhibited non-movement of the pointer.

4. The method of claim 1, wherein determining the one or more rank percentiles of the pointer signal is based on one or more fractions for one or more time units of a plurality of time units of the video.

5. The method of claim 1, wherein determining the slope of the pointer signal is based on one or more fractions for one or more time units of a plurality of time units of the video.

6. The method of claim 1, wherein the temporal region of interest of the video is correlated to a reduced amount of aggregate pointer movement in comparison to one or more other regions of the video.

7. The method of claim 1, wherein the preview of the video is defined by at least one of an image frame of the video or a portion of the video.

8. A method, comprising:

transmitting a content page over a network to a plurality of client devices for rendering by the plurality of client devices to respective displays, the content page including a video and a cursor tracking module, wherein the cursor tracking module is stored in memory, wherein the cursor tracking module generates movement data identifying detected movement and non-movement of a mouse cursor when the video is actively playing by a given client device, the movement and the non-movement of the mouse cursor being controlled by a peripheral device that is connected to the given client device, wherein the movement data includes values that identify the movement and values that identify the non-movement of the mouse cursor as controlled by a pointer device occurring during active playback of the video;

receiving over the network the movement data from the plurality of client devices;

analyzing the movement data to identify one or more temporal regions of interest of the video, wherein analyzing the movement data includes generating a pointer signal that indicates amounts of aggregate pointer movement versus elapsed time of the video, and identifying one or more temporal regions of the pointer signal that are used to identify the one or more temporal regions of interest of the video, wherein analyzing the movement data includes at least one of:

determining one or more rank percentiles of the pointer signal; or determining a slope of the pointer signal; and generating a preview of the video based on the one or more temporal regions of interest of the video.

9. The method of claim 8, wherein the movement and the non-movement of the mouse cursor occurs in response to input data generated by the peripheral device.

10. The method of claim 8, wherein analyzing the movement data includes determining one or more regions of the video having low levels of detected movement of the mouse cursor in comparison to overall levels of detected movement from a plurality of regions of the video.

11. A system, comprising:

a web server having at least one server computer, the web server providing a video over a network to a plurality of client devices, wherein each client device renders active playback of the video and tracks movements of a pointer during the active playback of the video, the movements of the pointer being controlled by a pointer device that is connected to the client device, wherein the web server provides a content page that includes the video, the content page including a pointer tracking module that tracks the movements of the pointer as controlled by the pointer device during the active playback of the video and generates movement data;

a pointer signal aggregator that receives, over the network from each client device, the movement data, wherein the movement data quantifies the movements of the pointer as controlled by the pointer device during the active playback of the video, wherein the movement data includes values that identify movement and values that identify non-movement of the pointer occurring during the active playback of the video, wherein the pointer signal aggregator processes the movement data from the plurality of client devices to determine aggregate pointer movement versus elapsed time of the video, wherein processing the movement data includes generating a pointer signal that indicates amounts of the aggregate pointer movement versus the elapsed time of the video;

an interestingness analyzer that analyzes the aggregate pointer movement to identify a temporal region of interest of the video, wherein analyzing the aggregate pointer movement includes identifying a temporal region of the pointer signal that is used to identify the temporal region of interest of the video, wherein analyzing the aggregate pointer movement includes at least one of:

determining one or more rank percentiles of the pointer signal; or determining a slope of the pointer signal; and a preview generator that generates a preview of the video based on the temporal region of interest, wherein at least some of at least one of the pointer tracking module, the pointer signal aggregator, the interestingness analyzer or the preview generator is stored in memory.

12. The system of claim 11, wherein the pointer tracking module determines a playback status of the video when tracking the movements of the pointer.

13. The system of claim 12,
the playback status identifying when the video was actively playing, wherein the movement data includes the playback status.

14. The system of claim 13,
wherein the pointer signal aggregator disregards movement data indicative of movement of the pointer that occurred when the video was not actively playing.

15. The system of claim 13,
wherein the pointer signal aggregator disregards movement data indicative of non-movement of the pointer that occurred when the video was not actively playing.

16. The system of claim 11, wherein generating the pointer signal includes determining, for each of a plurality of time units of the video, a fraction, of the plurality of client devices that actively played the time unit of the video, that exhibited non-movement of the pointer.

17. The system of claim 16, wherein determining the one or more rank percentiles of the pointer signal is based on one or more fractions for one or more time units of a plurality of time units of the video.

18. The system of claim 16, wherein determining the slope of the pointer signal is based on one or more fractions for one or more time units of a plurality of time units of the video.

19. The system of claim 11, wherein the temporal region of interest of the video is correlated to a reduced amount of aggregate pointer movement in comparison to one or more other regions of the video.

20. The system of claim 11, wherein the preview of the video is defined by at least one of an image frame of the video or a portion of the video.

* * * * *